United States Patent Office 3,790,679
Patented Feb. 5, 1974

3,790,679
URINARY ANTISEPTIC METHOD WITH THIOACETAMIDINES
Philip J. Shea, Zionsville, Ind., assignor to The Dow Chemical Company, Midland, Mich.
No Drawing. Filed May 30, 1972, Ser. No. 257,941
Int. Cl. A61k 27/00
U.S. Cl. 424—326                8 Claims

ABSTRACT OF THE DISCLOSURE

This invention relates to a method useful for combating microorganisms associated with infections of the urinary tract in mammals by means of administering to mammals an amount of a substituted acetamidine compound such as 2-(4-chlorophenyl)thioacetamidine, its corresponding oxime or a pharmacologically-acceptable salt thereof sufficient to provide an antiseptic amount of said compound in the urinary tract or in the urine.

BACKGROUND OF THE INVENTION

The compounds employed in the method of the invention can be prepared by procedures similar to those described in U.S. Pat. 3,334,137 for thioacetamidoximes, U.S. Pat. 3,334,138, and U.S. Pat. 3,417,122. Thioacetamidoximes are also disclosed by Schaefer et al. J. Org. Chem. 26, 412 (1961) and Craver et al., J. Pharm. Exptl. Therap. 99, 353 (1950).

SUMMARY OF THE INVENTION

This invention is directed to a method which comprises administering to a mammal a urinary antiseptic amount of substituted thioacetamidine compound or a pharmacologically-acceptable salt thereof, or a composition containing such substituted thioacetamidine compound or salt as the active urinary antiseptic ingredient therein; said substituted thioacetamidine compound corresponding to the formula:

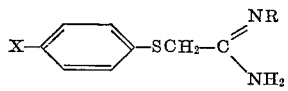

wherein X represents chloro or bromo and R represents hydrogen or hydroxyl. For the purpose of brevity, such compounds will be hereinafter referred to as "substituted thioamidines." The method of the invention is particularly useful for combating bacterial microorganisms which may infect the mammalian urinary system. The method can be employed prophylactically, to protect urinary tract organs such as the bladder, kidneys or ureter, or it may be employed therapeutically to alleviate existing infections. For example, the 2-(4-bromophenylthio)acetamidoxime exhibits urinary tract antimicrobial activity against *Proteus mirabilis* infection of the bladder in a procedure similar to that of Miraglia, Transact, N.Y. Acad. Sci. 32, 337 (1970), when administered in daily repeated oral dosages at a rate of about 100 milligrams per kilogram.

It has been found that the substituted thioamidines of the above formula have useful urinary antiseptic properties. Administration of one or more of the substituted thioamidine compounds to mammals has been found to impart valuable antimicrobial or antiseptic properties to the urine, thus providing for antimicrobial effect in the organs of the urinary tract which normally contact the urine. The compounds have little or no significant detrimental pharmacological effects at dosages consistent with good urinary antiseptic activity. The substituted thioamidine compounds are crystalline solids which are soluble in aqueous liquids and which in particular, are soluble in mammalian urine to an extent sufficient to provide excellent antimicrobial concentrations of the active thioamidine compound in the urine. In general, the pharmacologically-acceptable salts are more soluble in aqueous liquids, and the substituted thioamidines are preferably employed in the form of such salts.

As employed herein, the phrase "pharmacologically-acceptable salt" refers to salts of the substituted thioamidines, the anions of which are relatively nontoxic and innocuous to mammals at dosages consistent with good urinary antiseptic activity so that side effects ascribable to the anions do not vitiate the beneficial effects of the substituted thioamidines. Suitable pharmacologically-acceptable salts which can be employed in the method and composition of the invention include those derived from mineral acids such as the hydrochloride, hydrobromide, phosphate, nitrate and sulfate salts, those derived from organic carboxylic acids such as the succinate, tartrate, citrate, malate, maleate, and acetate salts and those derived from organic sulfonic acids such as methanesulfonate and toluenesulfonate salts.

In practicing the method, a urinary antiseptic amount of one or more substituted thioamidine is administered internally to a mammal by a route effective to introduce an antiseptic amount of the compound into the urinary tract of the mammal. Administration can thus be carried out either by a parenteral route such as intraperitoneal, intravenous or intramuscular injection, or by introduction into the gastrointestinal tract by oral administration, for example, to introduce the compound into the urinary tract via the blood stream and the kidneys. The substituted amidines can also be introduced directly into the urinary tract by catheter, although this route is generally less desirable.

In a preferred procedure, a urinary antiseptic amount of the active substituted thioamidine or a composition containing the same is administered orally to a mammal having suffering from a microbial infection of the urinary tract.

The urinary antiseptic amount of compound, that is, the amount of the substituted thioamidine compound sufficient to provide an antiseptic or antimicrobial amount in the urinary tract depends on various factors such as the size, type and age of the animal to be treated, the particular amidine or pharmacologically-acceptable salt employed, the route and frequency of administration, the degree of infection (if any) and the organism involved, the time the compound is administered relative to prior and subsequent presentation of food and liquids; provided, however, that the animal is administered sufficient of the active substituted thioamidine to provide antimicrobial amount thereof in the urinary tract. In particular cases, the dosage to be administered can be ascertained by conventional range finding techniques, for example, by observing the antimicrobial activity of the urine produced by administration at different dosage rates.

Generally, the compound is administered at dosage rates from about 1 to about 4 to about 25 to about 50 to about 120 milligrams of substituted thioamidine compound per kilogram of animal body weight. Higher dosage rates may be employed when the compound is administered directly, as in urinary tract irrigation. When administered by injection, good results are obtained with a urinary anti-septic amount of from about 1 or less to about 50 or more miligrams of the thioamidine compound per kilogram of animal body weight. From about 20 to 120 milligrams of the amidine compound per kilogram, depending on dosage unit form employed, provide good results when the compound is administered orally. In the case of mammals suffering from a urinary tract infection, administration of a urinary antiseptic amount of the substituted thioamidine compound is preferably repeated at predetermined intervals to provide a substantially continuous antimicrobial amount of the active compound in the urinary tract until the infection is alleviated or controlled. The concentration of active compound in the urinary tract can be monitored by periodic assays of urine specimens, for example, and the state of the infection can be followed by observation of symptoms, including observation of urine. It is generally desirable to administer the individual dosages at the lowest urinary antiseptic amount which provides the desired continuity consonant with a convenient dosing schedule. In a convenient repetitive procedure, the substituted thioamidines are administered in single or divided oral doses at daily rates of about 30 to 150 milligrams per kilogram per day for from about five to twenty or more days. Dosage units adaptable to oral administration such as tablets, capsules, lozenges, elixirs, syrups and the like are preferred and the active thioamidine compound can be formulated in conventional timed release capsule or tablet formulations, in which case the preferred dosage per unit is from aybout 50 milligrams or less to about 300 milligrams or more per unit.

In practicing the method of the invention, the active ingredient is preferably incorporated in a composition comprising a pharmaceutical carried and from about 5 to about 90 percent by weight of the substituted thioamidine compound or a pharmacologically-acceptable salt thereof. The term "pharmaceutical carrier" refers to known pharmaceutical excipients useful in formulating pharmacologically-active compounds for internal administration to animals, and which are substantially nontoxic and nonsensitizing under conditions of use. The compositions are then administered to mammals and in particular to mammals having a urinary tract infection, particularly an infection involving Escherichia, Pseudomonas or Proteus microorganisms, in an amount sufficient to constitute dosage of said animal with a urinary antiseptic amount of the active thioamidine compound. The compounds may also be administered in conjunction with other active ingredients or other urinary antiseptic agents, for example, to utilize a combination of effects, synergistic action, combined antiinflammatory and anti-septic activity, or in combination with agents having a somewhat different spectrum of antimicrobial activity so that one agent has a primarily prophylactic effect while the other agent serves a primarily thereapeutic effect.

DESCRIPTION OF THE PREFERRED EMBODIMENTS

The following examples illustrate the invention.

Example 1

5.3 grams of sodium carbonate is dissolved in 20 milliliters of water and 8.4 grams of hydroxylamine hydrochloride are added. The mixture is then added to a solution of 0.1 mole of 4-chlorophenylthioacetonitrile in 175 milliliters of aqueous 95 percent ethanol. The resulting mixture is heated with stirring for about 5 to 6 hours at a temperature of 65°–70° C., then evaporated to dryness under reduced pressure. The residue is taken up in water and hydrochloric acid is added to lower the pH to less than 7, after which the slightly acid mixture is washed with diethyl ether. Sodium carbonate is then added until separation of the resulting 2-(4-chlorophenylthio)-acetamidoxime free base product is complete. The product is taken up in about 50 milliliters of water, excess hydrochloric acid is added to the mixture, and the mixture is evaporated to dryness. The 2-(4-chlorophenylthio) actamidoxime hydrochloride product is purified by recrystallization from isopropanol and isopropanoldioxane mixtures, and found to melt at a temperature of 153°–155° C. 2 - (4 - bromophenylthio)acetamidoxime, melting at 82°–85° C., is prepared by a similar procedure.

Example 2

0.23 gram of sodium is reacted carefully with 50 milliliters absolute methanol to prepare a mixture of sodium methoxide in methanol. 22.8 grams (0.1 mole) of 2-(4-bromophenylthio)acetonitrile is added to the mixture and the resulting mixture is stirred at room temperature for about 2 hours, mixed with an additional 0.1 mole of sodium methoxide and heated to 65° C., then held at room temperature for two hours. 6.5 grams of ammonium chloride is added directly to the mixture, and stirring at room temperature is continued for about 18 hours. The mixture is evaporated under reduced pressure, and the residue is triturate with diethyl ether. The product is further purified by recrystallization from water, then from ethanol and then from ethanol/ethylacetate. The 2-(4-bromophenylthio)acetamidine hydrochloride product is found to melt at a temperature of 186.5°–188.5° C. 2-(4-chlorophenylthio)acetamidine hydrochloride, melting at 194°–196° C. is prepared in a similar manner.

Example 3

Separate groups of mice are fasted overnight, but are provided with water ad libitum prior to oral administration of a test compound. The test compounds are administered orally at a dosage rate of 60 milligrams of test compound per kilogram of animal body weight in an aqueous carrier. Urine is collected in sterile containers at intervals over the period from 1 to 24 hours after administration of the test compound. The collected urine is assayed for antimicrobial activity against *Escherichia coli*, *Pseudomonas aeruginosa* and *Proteus vulgaris* or *Proteus mirabilis*. Urine sample collected from the seperate groups of mice administered one of 2-(4-chlorophenylthio)acetamidine hydrochloride and 2-(4-chlorophenylthio)-acetamidoxime hydrochloride are found to be active against all three test organisms. In similar operations, urine from mice administered 60 milligrams per kilogram of one of 2-(4-chlorophenoxy)acetamidine hydrochloride; 2-(4-chlorophenoxy)acetamidoxime hydrochloride; 2-(4-methylphenylthio)acetamidoxime hydrochloride and 2-benzylthioacetamidoxime hydrochloride are found to be ineffective against any of the named organisms.

Example 4

2-(4-bromophenylthio)acetamidoxime is employed as a test compound in a procedure similar to that of Miraglia, Transact. N.Y. Acad. Sci. 32, 337 (1970). In such procedure rats having a *Proteus mirabilis* infection of the bladder are administered said test compound in a daily oral dose of 100 milligrams per kilogram for 15 days. Microbiological examination of the kidneys and bladder of the treated rats indicates a significant decrease in the extent of infection as compared with similar infected rats not treated with a test compound.

I claim:

1. A method useful for combating bacterial infections of the mammalian urinary tract, the method comprising administering internally to a mammal an effective urinary antiseptic amount of a compound corresponding to the formula:

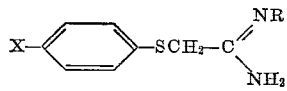

wherein X represents chloro or bromo and R represents hydrogen or hydroxyl, or a pharmacologically-acceptable salt thereof.

2. The method of claim 1 wherein R is hydrogen.
3. The method of claim 1 wherein X is bromo.
4. The method of claim 1 wherein X is chloro.
5. The method of claim 1 wherein R is hydroxyl.

6. The method of claim 1 wherein the bacteria is a species of *Escherichia, Pseudomonas* or *Proteus*.

7. The method of claim 1 wherein the compound is administered daily for from about 5 to about 20 days.

8. The method of claim 7 wherein the compound is administered at a daily rate of from about 30 to about 150 milligrams per kilogram per day.

References Cited
UNITED STATES PATENTS

| | | | |
|---|---|---|---|
| 3,417,122 | 12/1968 | McManus | 260—564 R |
| 3,513,197 | 5/1970 | Daum et al. | 424—326 |
| 3,607,941 | 9/1971 | Bailey | 424—326 |

JEROME D. GOLDBERG, Primary Examiner